US012731728B2

(12) United States Patent
Park

(10) Patent No.: US 12,731,728 B2
(45) Date of Patent: Sep. 8, 2026

(54) INDUCTOR COMPONENT

(71) Applicant: SAMSUNG ELECTRO-MECHANICS CO., LTD., Suwon-si (KR)

(72) Inventor: Kwang Il Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1046 days.

(21) Appl. No.: 17/748,276

(22) Filed: May 19, 2022

(65) Prior Publication Data

US 2023/0207189 A1 Jun. 29, 2023

(30) Foreign Application Priority Data

Dec. 29, 2021 (KR) ........................ 10-2021-0191597

(51) Int. Cl.
*H01F 37/00* (2006.01)
*H01F 27/02* (2006.01)
*H01F 27/28* (2006.01)

(52) U.S. Cl.
CPC ............. *H01F 37/00* (2013.01); *H01F 27/02* (2013.01); *H01F 27/28* (2013.01)

(58) Field of Classification Search
CPC ........... H01F 37/00; H01F 27/02; H01F 27/28
(Continued)

(56) References Cited

U.S. PATENT DOCUMENTS 4,975,671 A * 12/1990 Dirks .................. H01F 17/0033 336/200
5,455,552 A * 10/1995 Metsler ................... H01F 27/29 336/83

(Continued)

FOREIGN PATENT DOCUMENTS

JP 57-117620 U 7/1982
JP S57-117620 U 7/1982

(Continued)

OTHER PUBLICATIONS

Sankarasubramanian et al., Magnetic Inductor Arrays for Intel® Fully Integrated Voltage Regulator (FIVR) on 10th generation Intel® Core™ SoCs, IEEE 70th Electronic Components and Technology Conference (ECTC), Orlando, FL, USA 2020.

(Continued)

*Primary Examiner* — Shawki S Ismail
*Assistant Examiner* — Joselito S. Baisa
(74) *Attorney, Agent, or Firm* — Morgan, Lewis & Bockius LLP

(57) ABSTRACT

An inductor component includes a body including a first surface and a second surface opposing each other in a first direction, and a third surface and a fourth surface connected to the first surface and the second surface and opposing each other in a second direction, a first conductor disposed in the body and extending in the first direction, a second conductor disposed adjacent to the first conductor in the body and extending in the first direction, a first pad and a second pad disposed on the third surface of the body, a first conductive via extending in the second direction and connecting the first conductor and the first pad, and a second conductive via extending in the second direction and connecting the second conductor and the second pad. The second conductor is
(Continued)

disposed to be shifted with respect to the first conductor in the first direction.

14 Claims, 9 Drawing Sheets

(58) Field of Classification Search
USPC .................................................... 336/65, 200
See application file for complete search history.

(56) References Cited

U.S. PATENT DOCUMENTS

| | | | | |
|---|---|---|---|---|
| 6,191,667 | B1 | 2/2001 | Takenaka et al. | |
| 7,292,128 | B2 * | 11/2007 | Hanley | H01F 17/06 336/178 |
| 8,358,193 | B2 * | 1/2013 | Dalmia | H01F 17/062 336/229 |
| 8,466,769 | B2 * | 6/2013 | Dalmia | H01F 27/2804 336/200 |
| 8,742,536 | B2 * | 6/2014 | Freywald | H01L 21/76232 438/424 |
| 9,281,115 | B2 * | 3/2016 | Ikriannikov | H01F 27/292 |
| 10,141,107 | B2 * | 11/2018 | Lee | H01F 27/2804 |
| 11,239,022 | B2 * | 2/2022 | Otsubo | H01F 27/29 |
| 2016/0372246 | A1 | 12/2016 | Otsubo et al. | |
| 2017/0186528 | A1 | 6/2017 | Otsubo et al. | |
| 2020/0013533 | A1 | 1/2020 | Sankarasubramanian et al. | |
| 2020/0066634 | A1 | 2/2020 | Do et al. | |
| 2020/0321157 | A1 * | 10/2020 | Kawai | H03H 7/0115 |
| 2021/0104353 | A1 | 4/2021 | Yamauchi et al. | |
| 2022/0068553 | A1 * | 3/2022 | Yoshioka | H01F 17/0006 |
| 2023/0343685 | A1 * | 10/2023 | Wakazono | H01F 17/0013 |
| 2025/0167091 | A1 * | 5/2025 | Wakazono | H01F 17/00 |

FOREIGN PATENT DOCUMENTS

| | | | | | |
|---|---|---|---|---|---|
| JP | 11-283833 | A | | 10/1999 | |
| JP | H11-283833 | A | | 10/1999 | |
| JP | 2000-021633 | A | | 1/2000 | |
| JP | 2000353619 | A | | 12/2000 | |
| JP | 2012178391 | A | * | 9/2012 | |
| JP | 2016-039256 | A | | 3/2016 | |
| JP | 2020-188150 | A | | 11/2020 | |
| JP | 2021-061279 | A | | 4/2021 | |
| WO | WO-2014054371 | A1 | * | 4/2014 | G01R 33/063 |
| WO | 2015/133310 | A1 | | 9/2015 | |
| WO | 2016/043306 | A1 | | 3/2016 | |
| WO | WO-2023089967 | A1 | * | 5/2023 | H05K 1/16 |

OTHER PUBLICATIONS

Office Action issued on Dec. 9, 2025 in corresponding Japanese Patent Application No. 2022-087319 with English translation.

Office Action issued on Feb. 2, 2026 in the corresponding Korean Patent Application No. 10-2021-0191597 with English translation.

Office Action dated May 19, 2026 in the corresponding Japanese Patent Application No. 2022-087319 with the English translation. Note: JP 2021-061279 A, JP H11-283833 A, and JP S57-117620 U already submitted.).

* cited by examiner

INDUCTOR COMPONENT

CROSS-REFERENCE TO RELATED APPLICATION

This application claims the benefit of priority to Korean Patent Application No. 10-2021-0191597 filed on Dec. 29, 2021 in the Korean Intellectual Property Office, the entire disclosure of which is incorporated herein by reference for all purposes.

TECHNICAL FIELD

The present disclosure relates to an inductor component.

BACKGROUND

In the case of microprocessors, different levels of voltage are required to implement various functions, and for management thereof, integrated voltage regulation technology is required. To this end, an inductor component is required in a microprocessor, and an inductor component having a Magnetic Inductor Array (MIA) structure with a plurality of conductor traces is used. The inductor component of the MIA structure is mounted on the package substrate and may form an inductor structure together with the conductor outside the inductor component.

Recently, as demand for miniaturization of microprocessors has increased, the size of inductor components is also decreasing. Due to the miniaturization of the inductor component, it is difficult to implement sufficient inductance characteristics, and accordingly, there is a problem in that the Q factor of the inductor component is reduced.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide an inductor component advantageous for miniaturization while implementing sufficient inductance characteristics.

As a method for resolve the above problems, the present disclosure intends to propose a novel structure of an inductor component through an example. According to an aspect of the present disclosure, an inductor component includes a body including a first surface and a second surface opposing each other in a first direction, and a third surface and a fourth surface connected to the first surface and the second surface and opposing each other in a second direction, a first conductor disposed in the body and extending in the first direction, a second conductor disposed adjacent to the first conductor in the body and extending in the first direction, a first pad and a second pad disposed on the third surface of the body, a first conductive via extending in the second direction and connecting the first conductor and the first pad, and a second conductive via extending in the second direction and connecting the second conductor and the second pad. The second conductor is disposed to be shifted with respect to the first conductor in the first direction.

The first and second conductors may be provided as a plurality of first conductors and a plurality of second conductors, respectively, and the plurality of first conductors and the plurality of second conductors may be alternately disposed in one direction.

The one direction may be a third direction, perpendicular to the first and second directions.

When a direction perpendicular to the first and second directions is a third direction, the first and second conductors may be disposed to be shifted with respect to each other in the first direction in a range in which the first and second conductors partially overlap in the third direction.

The body may be free of an additional conductor connecting the first and second conductors.

The first pad and the first conductive via may be provided as a pair of first pads and a pair of first conductive vias, respectively, and the pair of first conductive vias may be connected to one end and the other end of the first conductor, respectively.

The second pad and the second conductive via may be provided as a pair of second pads and a pair of second conductive vias, respectively, and the pair of second conductive vias may be connected to one end and the other end of the second conductor, respectively.

One end and the other end of the first conductor may be a first pad area having a width greater than widths of other areas of the first conductor, and one end and the other end of the second conductor may be a second pad area having a width greater than widths of other areas of the second conductor.

The first and second pad areas partially overlap in the first direction.

The first and second conductors may be provided as a plurality of first conductors and a plurality of second conductors, respectively, and the plurality of first conductors and the plurality of second conductors may be arranged in the first direction.

According to an aspect of the present disclosure, an inductor component includes a body including a first surface and a second surface opposing each other in a first direction, and a third surface and a fourth surface connected to the first and second surfaces and opposing each other in a second direction, a first conductor having a rod shape, disposed in the body, and extending in the first direction, a second conductor having a coil shape and disposed adjacent to the first conductor in the body, a first pad and a second pad disposed on the third surface of the body, a first conductive via extending in the second direction and connecting the first conductor and the first pad, and a second conductive via extending in the second direction and connecting the second conductor and the second pad.

The first and second conductors may be provided as a plurality of first conductors and a plurality of second conductors, respectively, and the plurality of first conductors and the plurality of second conductors may be alternately disposed in a third direction perpendicular to the first and second directions.

The first conductor may be provided as a plurality of first conductors, and at least two of the plurality of first conductors may have different lengths in the first direction.

The inductor component may further include a third conductor having a rod shape, disposed in the body, and extending in a third direction perpendicular to the first and second directions.

The third direction may be perpendicular to the first and second directions, and the first and second conductors may be disposed adjacent to each other in the third direction.

The second and third conductors may at least partially overlap in the first direction.

According to an aspect of the present disclosure, an inductor component includes a body including a first surface and a second surface opposing each other in a first direction, and a third surface and a fourth surface connected to the first surface and the second surface and opposing each other in a second direction, a first conductor disposed in the body and extending in the first direction, a second conductor disposed adjacent to the first conductor in the body and extending in the first direction, a first pad and a second pad disposed on the third surface of the body, a first conductive via extending in the second direction and connecting the first conductor and the first pad, and a second conductive via extending in the second direction and connecting the second conductor and the second pad. In the first direction, the first conductor is closer to the second surface of the body than the second conductor, and the second conductor is closer to the first surface of the body than the first conductor.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
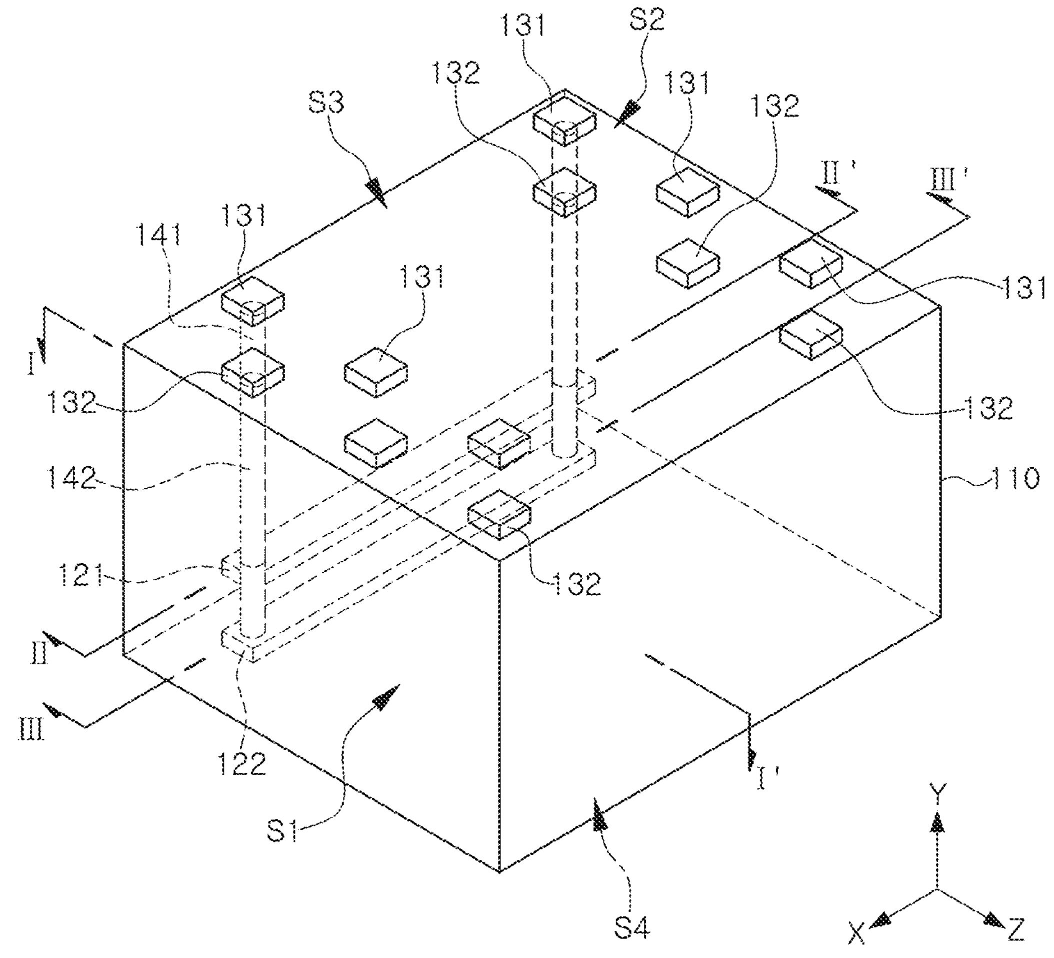
FIG. 1 is a perspective view schematically illustrating an inductor component according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided and thus, this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least an embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the detailed shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

Figure 2:
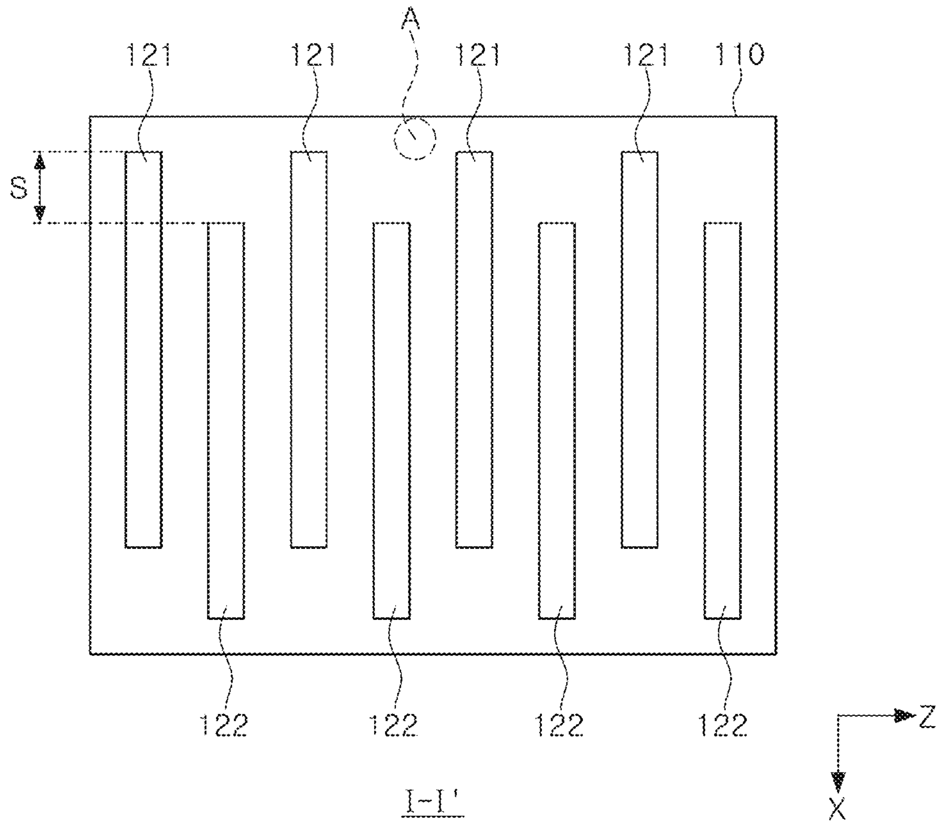
FIGS. 2, 4 and 5 correspond to cross-sectional views of the inductor component of FIG. 1.
Figure 3:
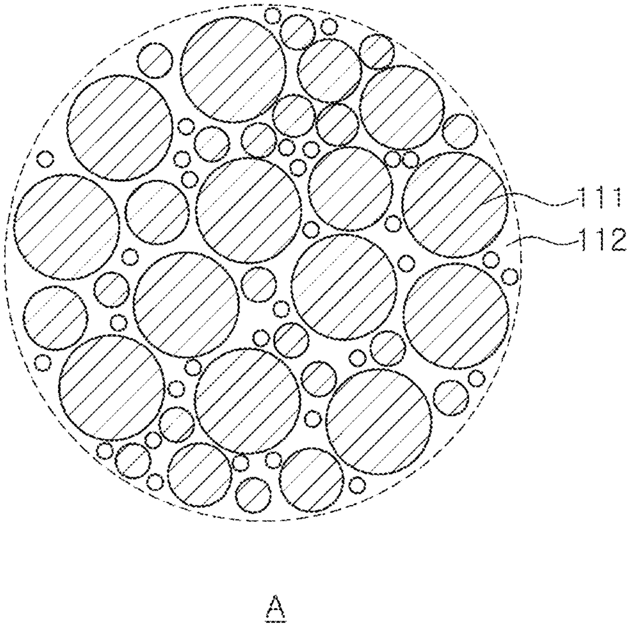
FIG. 3 is an enlarged view of area A in FIG. 2.
Figure 4:
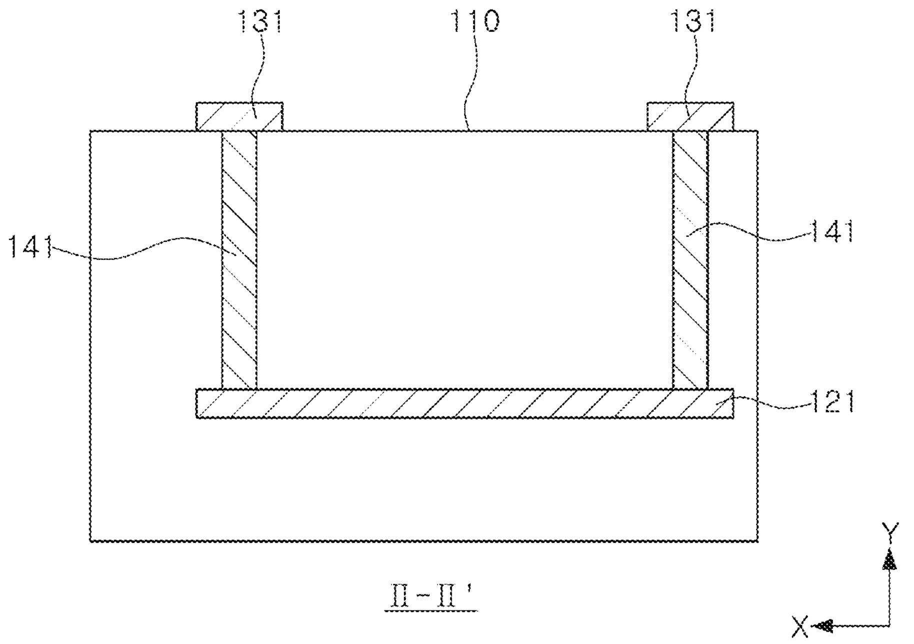
Figure 5:
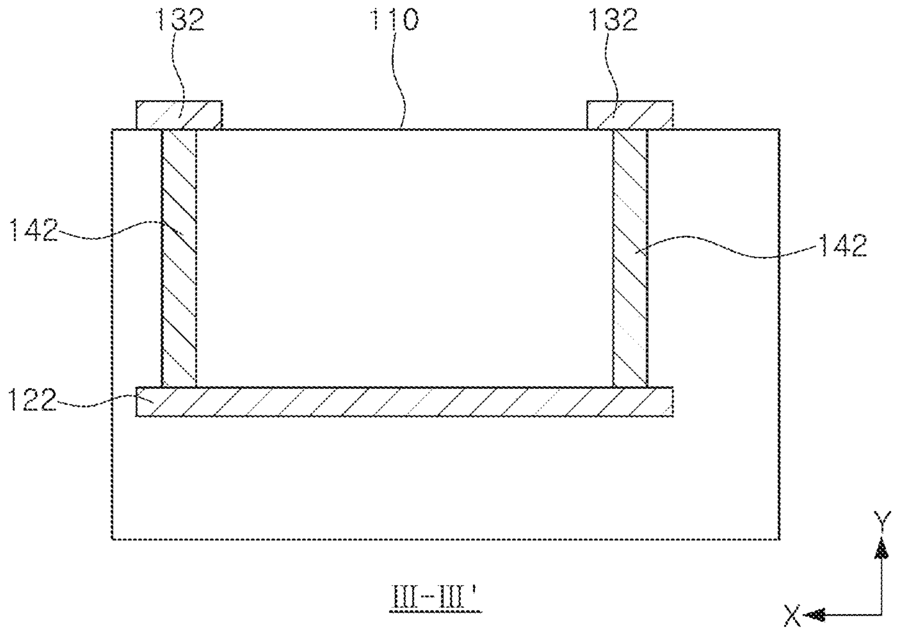
Figure 6:
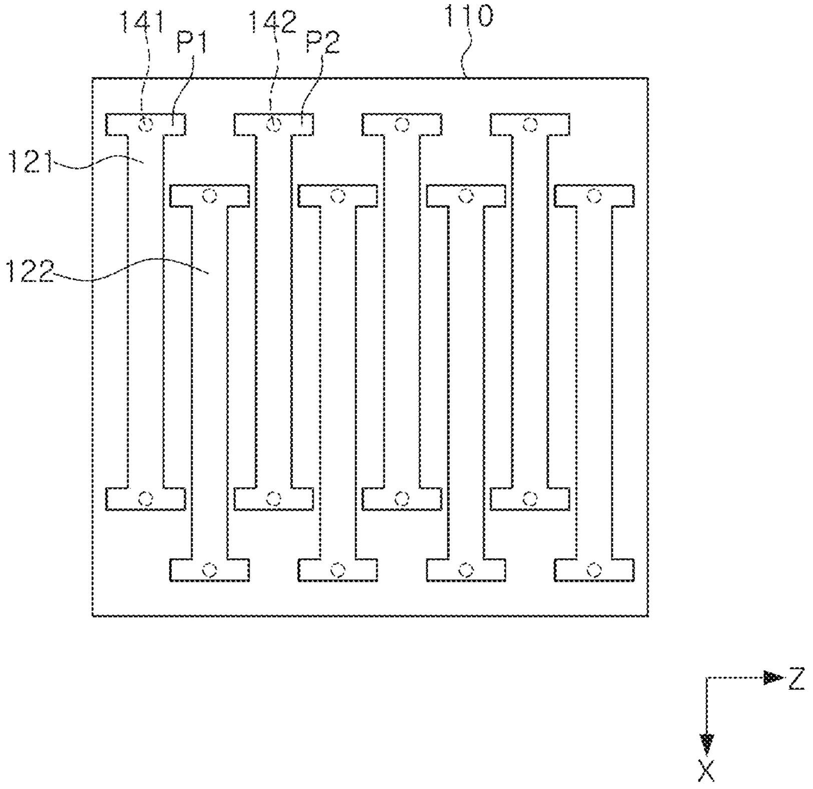
FIGS. 6, 7, 8, 9, and 10 illustrate shapes of first and second conductors that may be employed in modified examples.

FIG. 1 is a perspective view schematically illustrating an inductor component according to an embodiment. FIGS. 2, 4 and 5 correspond to cross-sectional views of the inductor component of FIG. 1. FIG. 3 is an enlarged view of area A in FIG. 2.

Referring to FIGS. 1 to 5, an inductor component 100 according to an embodiment includes a body 110, a first conductor 121, a second conductor 122, a first pad 131, a second pad 132, a first conductive via 141, and a second conductive via 142. In this case, the second conductor 122 is disposed adjacent to the first conductor 121 and shifted in a first direction (X-direction) with respect to the first conductor 121. For convenience of illustration, only one of the first and second conductors 121 and 122 is illustrated in FIG. 1.

The body 110 may form the exterior of the inductor component 100 and may be formed to have a hexahedral shape as a whole. The body 110 includes a first surface S1 and a second surface S2 opposing each other in the first direction (X-direction), and a third surface S3 and a fourth surface S4 connected to the first surface S1 and the second surface S2 and opposing each other in a second direction (Y-direction). In this case, the third surface S3 of the body 110 may be used as a mounting surface in disposing the inductor component 100 on another substrate or package. Referring to FIG. 3, the body 110 may include magnetic particles 111 and an insulating resin 112. In this case, the body 110 may be formed by laminating one or more magnetic composite sheets including an insulating resin and a magnetic metal powder dispersed in the insulating resin. The insulating resin 112 may include, but is not limited to, epoxy, polyimide, liquid crystal polymer, or the like alone or in combination. The magnetic particles 111 may include at least one selected from the group consisting of iron (Fe), silicon (Si), chromium (Cr), cobalt (Co), molybdenum (Mo), aluminum (Al), niobium (Nb), copper (Cu), boron (B), and nickel (Ni). For example, the magnetic particles 111 may be formed using at least one or more of pure iron powder, Fe—Si alloy powder, Fe—Si—Al alloy powder, Fe—Ni alloy powder, Fe—Ni—Mo alloy powder, Fe—Ni—Mo—Cu alloy powder, Fe—Co alloy powder, Fe—Ni—Co alloy powder, Fe—Cr alloy powder, Fe—Cr—Si alloy powder, Fe—Si—Cu—Nb alloy powder, Fe—Ni—Cr alloy powder, and Fe—Cr—Al alloy powder. The magnetic particles 111 may be amorphous or crystalline. For example, the magnetic particles 111 may be Fe—Si-based amorphous alloy powder, but is not necessarily limited thereto. The magnetic particles 11 may have an average diameter of about 0.1 μm to 30 μm, but is not limited thereto. On the other hand, in the present specification, the diameter may refer to a particle size distribution represented as $D_{90}$, $D_{50}$, or the like.

The first and second conductors 121 and 122 are disposed in the body 110 and extend in the first direction (X-direction). As in the form illustrated in detail, the first and second conductors 121 and 122 may have a rod shape formed in the first direction (X-direction), and may be formed of a metal having relatively high electrical conductivity, such as copper (Cu), aluminum (Al), silver (Ag), tin (Sn), gold (Au), nickel (Ni), lead (Pb), titanium (Ti), chromium (Cr), molybdenum (Mo) or alloys thereof. In this case, the rod shape may be a form in which the lengths of the first and second conductors 121 and 122 in the first direction (X-direction) are longer than those in other directions (Y-direction and Z-direction).

In the present embodiment, the second conductor 122 is shifted in the first direction (X-direction) with respect to the first conductor 121, and by using this shift arrangement method, a relatively larger number of conductors 121 and 122 may be included in the body 110. Referring to FIG. 2, the shift arrangement of the first and second conductors 121 and 122 may indicate that one ends of the first and second conductors 121 and 122 adjacent to each other are spaced apart from each other with a predetermined distance S in the first direction (X-direction). As illustrated in the drawings, the first and second conductors 121 and 122 may be provided as a plurality of conductors, respectively, and may be alternately disposed in one direction. In more detail, the one direction may be a third direction (Z-direction) perpendicular to the first and second directions (X-direction and Y-direction). In addition, the first and second conductors 121 and 122 may be disposed shifted in the first direction (X-direction) in a range in which some regions overlap in the third direction (Z-direction). That is, in the first direction (X-direction), the first conductor 121 may be closer to the second surface S2 of the body 110 than the second conductor 122, and the second conductor 122 may be closer to the first surface S1 of the body 110 than the first conductor 121. If there is no overlapping region in the third direction (Z-direction), the length of the body 110 in the first direction (X-direction) may be excessively increased, which may be disadvantageous in downsizing the inductor component 100. When the inductor component 100 is mounted on a substrate or package, the first and second conductors 121 and 122 are interlocked with conductors present in the substrate and package to form an inductor structure as a whole. To this end, the first and second conductors 121 and 122 may not be connected to each other in the body 110. For example, an additional conductor connecting the first and second conductors 121 and 122 may not be present in the body 110. That is, the first conductor 121 and the second conductor 122 may be separated from each other within the body 110. On the other hand, although the present embodiment illustrates the case in which the first and second conductors 121 and 122 are each 4 in one body 110, and for example, a total of 8 conductors 121 and 122 are disposed; each of the first and second conductors 121 and 122 may be provided as one, two or three, respectively, and may also be provided with 5 or more.

As in the present embodiment, by disposing the first and second conductors 121 and 122 to be shifted within the body 110, the gap between the first and second conductors 121 and 122 may be reduced, and thus, a relatively larger number of conductors 121 and 122 may be disposed in one inductor component 100. In the case of the related art, when having 8 conductors 121 and 122 as in the present embodiment, two inductor components, for example, two inductor components having four conductors, should be employed. Meanwhile, in the present embodiment of the present disclosure, a larger number of conductors 121 and 122 may be disposed in one inductor component 100. As a detailed example, compared to the arrangement structure of the related art in which two MIA parts (length*width: 1.6 mm*1.3 mm) having four conductors arranged in one direction, rather than having a shift arrangement structure; as in the present embodiment, one inductor component including eight conductors having a shift arrangement structure may have a length*width of about 2.4 mm*1.45 mm, and the mounting area may be reduced to a level of about 20%. Furthermore, compared to the case of using 11 MIA components of the related art, when the components are integrated into one inductor component, the length*width is about 2.4 mm*7.3 mm, and the mounting area may be reduced to about 24%. According to the present embodiment, the number and mounting area of the inductor components 100 may be reduced in a microprocessor or the like based on the same performance standard. Therefore, beneficial effects such as a reduced package size and reduced package assembly costs may be expected.

The first pad 131 and the second pad 141 are disposed on the third surface S3 of the body 110. In addition, the first conductive via 141 extends in the second direction (Y-direction) to connect the first conductor 121 and the first pad 131. The second conductive via 142 extends in the second direction (Y-direction) to connect the second conductor 122 and the second pad 132. As illustrated, a pair of the first pads 131 and a pair of the first conductive vias 141 may be provided to be connected to one end and the other end of the first conductor 121. Similarly, a pair of the second pads 132 and a pair of the second conductive vias 142 are provided and may be connected to one end and the other end of the second conductor 122. In one embodiment, the first pad 131 may not overlap the second pad 132 in any direction among the first direction (X-direction), the second direction (Y-direction), and the third direction (Z-direction). Like the first and second conductors 121 and 122, the second pad 132 and the second conductive via 142 may be formed of a conductive material, such as copper (Cu), aluminum (Al), silver (Ag), tin (Sn), gold (Au), nickel (Ni), lead (Pb), titanium (Ti), chromium (Cr), molybdenum (Mo) or alloys thereof.

Modified embodiments will be described with reference to FIGS. 6 to 10. First, in the case of the embodiment of FIG. 6, pad areas P1 and P2 are formed in the first and second conductors 121 and 122. In detail, one end and the other end of the first conductor 121 are a first pad area P1 that is greater than the other regions, and one end and the other end of the second conductor 122 are a second pad area P2 that is greater than the other regions. In this case, the first conductive via 141 may be connected to the first pad area P1 of the first conductor 121, and the second conductive via 142 may be connected to the second pad area P2 of the second conductor 122. In this case, the first and second conductors 121 and 122 may be disposed such that partial regions of the first and second pad areas P1 and P2 overlap in the first direction (X-direction). As such, the first and second pad areas P1 and P2 partially overlap in the first direction (X-direction). A gap between the first and second conductors 121 and 122 may be significantly reduced, and accordingly, the number of conductors 121 and 122 that may be disposed in the body 110 may increase, which has the effect of reducing the size of the inductor component 100 having the same performance. The pad areas P1 and P2 used in the embodiment of FIG. 6 may also be applied to the embodiment of FIG. 7 described below.

Figure 7:
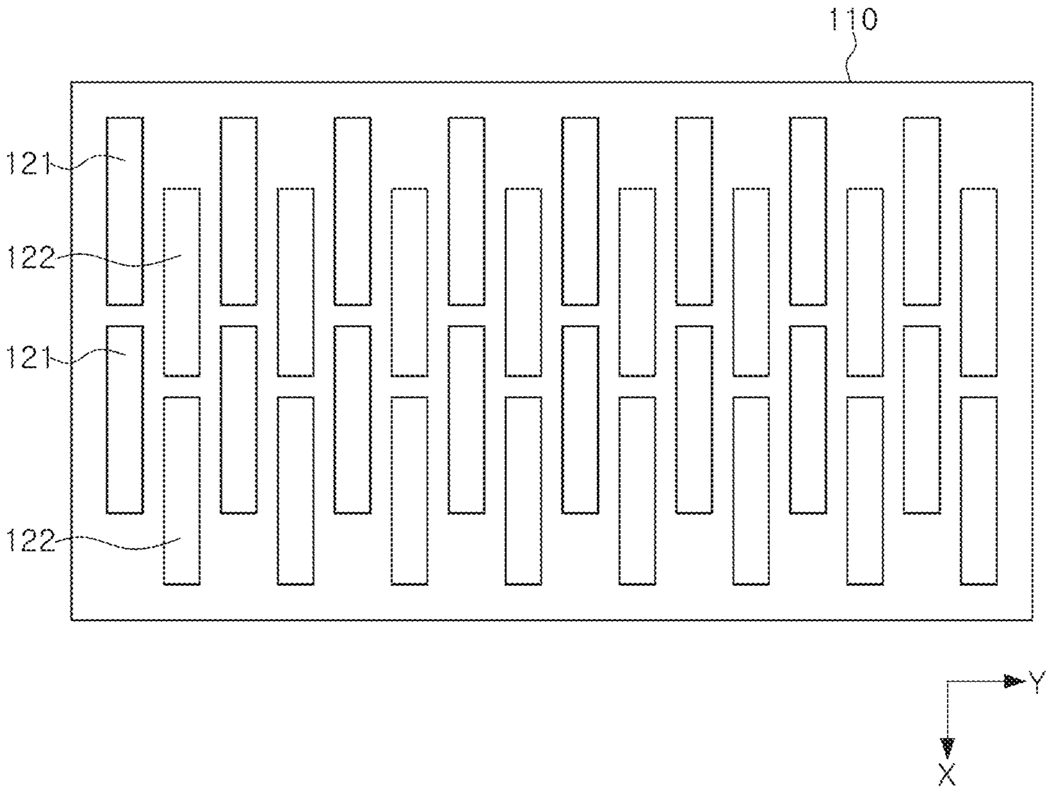
Figure 8:
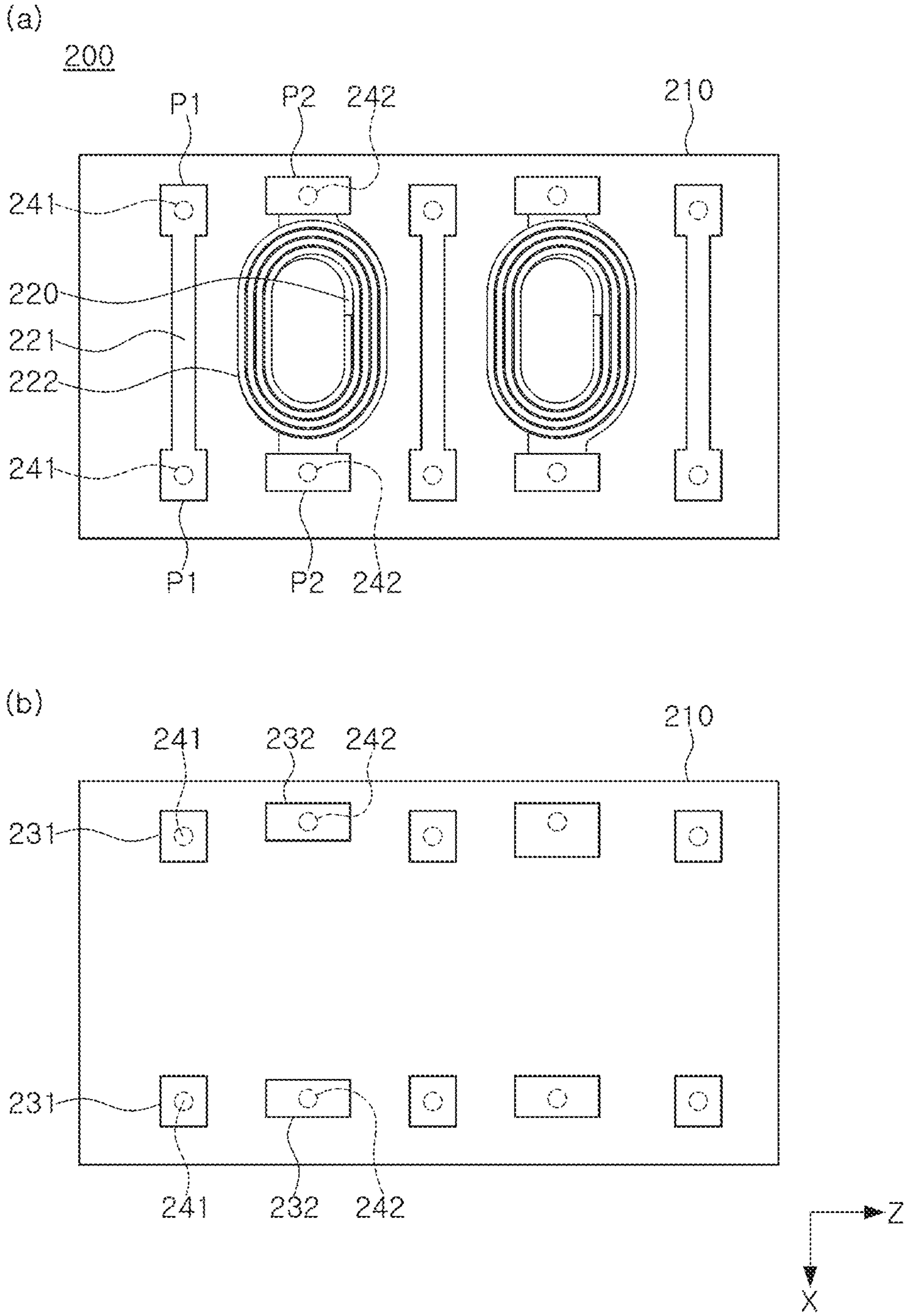
Figure 9:
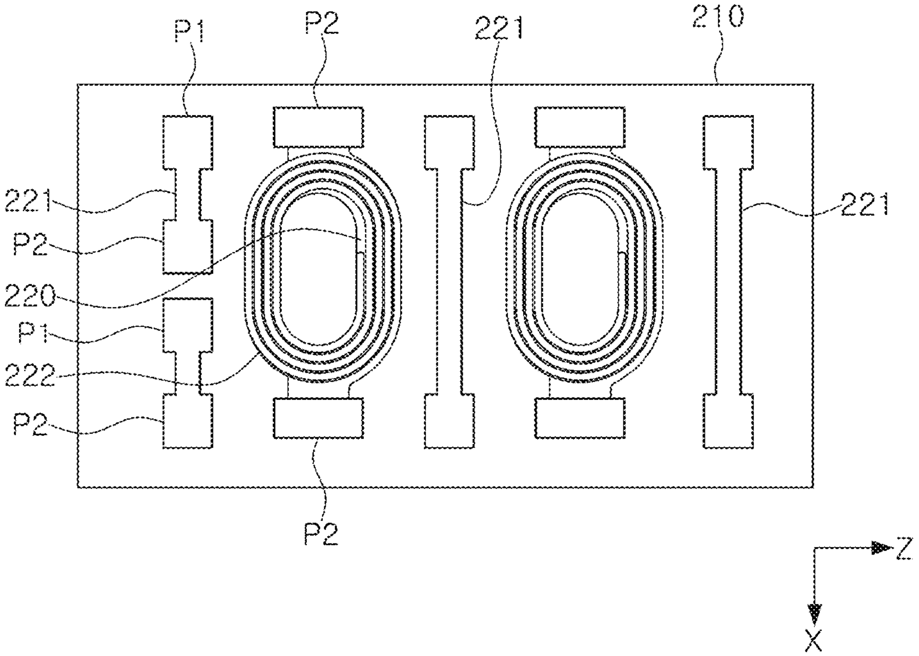
Figure 10:
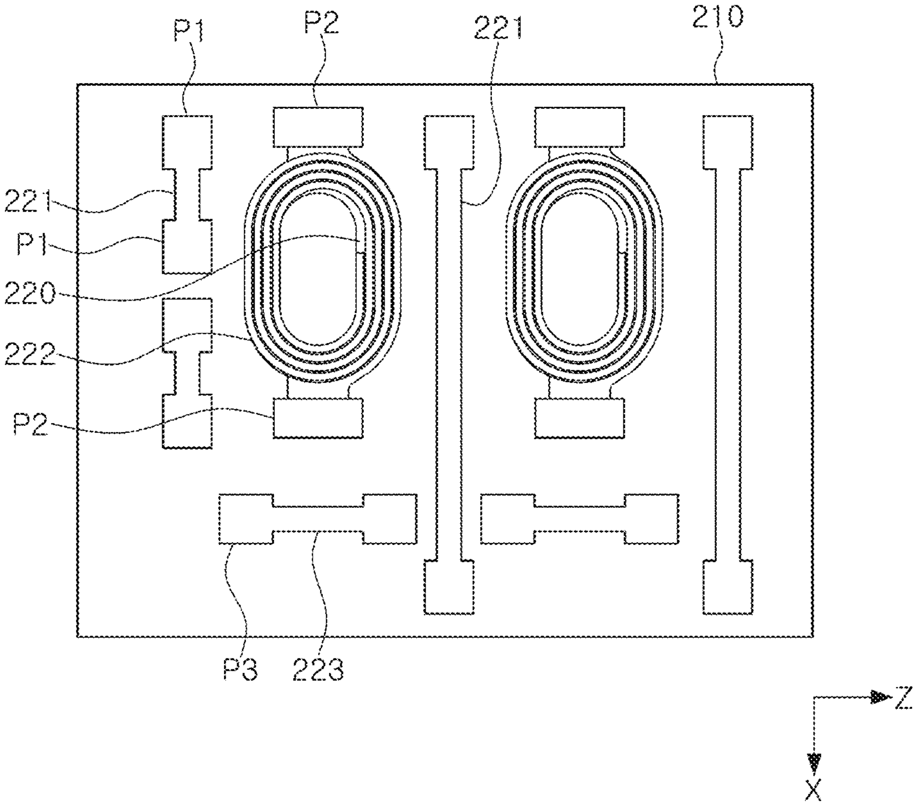

Next, in the case of the embodiment of FIG. 7, as a form having a larger number of conductors 121 and 122, a plurality of first conductors 121 are provided and arranged in the first direction (X-direction). Similarly, the second conductor 122 is provided as a plurality of second conductors 122 which are arranged in the first direction (X-direction). In this case, the number of the pads 131 and 132 and the conductive vias 141 and 142 may also increase according to the shapes of the first and second conductors 121 and 122.

Next, in the case of the embodiment of FIGS. 8A and 8B, an inductor component 200 includes conductors having different shapes, for example, a rod-shaped conductor 221 and a coil-shaped conductor 222. In the case of FIG. 8A, a cross-section in the body 210 is illustrated, and FIG. 8B illustrates a third surface S3 of the body 210. In this modified example, the first conductor 221 has a rod shape extending in the first direction (X-direction), and the second conductor 222 disposed adjacent thereto has a coil shape. In this case, a plurality of the first and second conductors 221 and 222 may be provided and may be alternately disposed in one direction. The coil-shaped second conductor 222 may be supported by a support member 220, and the second conductor 222 may be disposed on both the upper and lower surfaces of the support member 220. The support member 220 may be formed of an insulating material including at least one of a thermosetting insulating resin such as an epoxy resin, a thermoplastic insulating resin such as polyimide, and a photoimageable dielectric resin. Alternatively, the support member 220 may be formed of an insulating material in which at least one resin described above is impregnated with a reinforcing material such as glass fiber or an inorganic filler. In an example, the support member 220 may be formed of an insulating material such as Copper Clad Laminate (CCL), an insulation material (Unclad CCL) in which copper foil has been removed from a copper clad laminate, Prepreg, Ajinomoto Build-up Film (ABF), FR-4, Bismaleimide Triazine (BT) film, a Photo Imageable Dielectric (PID) film, or the like. However, the present disclosure is not limited thereto. As the inorganic filler, at least one selected from the group consisting of silica ($SiO_2$), alumina ($Al_2O_3$), silicon carbide (Sic), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

In this case, the second conductor 222 may include a seed layer and an electrolytic plating layer. In this case, the electrolytic plating layer may have a single-layer structure or a multilayer structure. The electrolytic plating layer having a multilayer structure may be formed in a conformal film structure in which one electrolytic plating layer is covered by another electrolytic plating layer, and may also be formed in a shape in which another electrolytic plating layer is laminated on only one surface of one electrolytic plating layer. The coil-shaped second conductor 222 may be formed of a conductive material such as, but is not limited thereto, copper (Cu), aluminum (Al), silver (Ag), tin (Sn), gold (Au), nickel (Ni), lead (Pb), titanium (Ti), chromium (Cr), molybdenum (Mo) or alloys thereof. In addition, the second conductor 222 having a coil shape may also have a coil structure of a winding type.

A first pad 231 and a second pad 232 are disposed on the third surface S3 of the body 210, and as in the previous embodiment, the first conductor 221 and the first pad 231 are connected by a first conductive via 241, and the second conductor 222 and the second pad 232 are connected by a second conductive via 242. As illustrated, one end and the other end of the first conductor 221 may be formed as a first pad area P1, and one end and the other end of the second conductor 222 may be formed as a second pad area P2. In this case, the width (e.g., the width in the Z-direction) of the second pad area P2 connected to the coil structure may be greater than the width of the first pad area P2. As in this modified example, by mixing the first conductor 221 and the second conductor 222 having different characteristics in one inductor component 200, the utilization of the inductor component 200 may increase. Furthermore, as in modified examples of FIGS. 9 and 10, more various conductors may be included. In detail, as in the modified example of FIG. 9, as the first conductor 221, the first conductors 221 having different lengths may be provided, and thus, the length of the overlap region thereof with the second conductor 222 may be adjusted. For example, a plurality of first conductors 221 may be provided, and at least two thereof may have different lengths in the first direction (X-direction). In addition, as in the modified example of FIG. 10, a rod-shaped conductor 223 disposed in another direction may be further provided. The third conductor 223 has a rod shape and extends in a third direction (Z-direction) perpendicular to the first and second directions (X-direction and Y-direction). One end and the other end of the third conductor 223 may be formed as third pad areas P3. In addition, the first and second conductors 221 and 222 are disposed adjacent to each other in the third direction (Z-direction), and at least some regions of the second and third conductors 222 and 223 may overlap each other in the first direction (Z-direction). By further including the third conductor 223 disposed in a direction different from the direction of the first conductor 221, a region thereof overlapping with the second conductor 222 in a different direction may be secured.

As set forth above, according to an embodiment, sufficient inductance characteristics and miniaturization of an inductor component may be improved.

While this disclosure includes detailed examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An inductor component comprising:

a body including a first surface and a second surface opposing each other in a first direction, and a third surface and a fourth surface connected to the first surface and the second surface and opposing each other in a second direction;

a first conductor disposed in the body and extending in the first direction;

a second conductor disposed adjacent to the first conductor in the body and extending in the first direction;

a first pad and a second pad disposed on the third surface of the body;

a first conductive via extending in the second direction and connecting the first conductor and the first pad; and a second conductive via extending in the second direction and connecting the second conductor and the second pad, wherein the first and second pads are in direct contact with the third surface of the body, and wherein the second conductor is disposed to be shifted with respect to the first conductor in the first direction.

2. The inductor component of claim 1, wherein the first and second conductors are provided as a plurality of first conductors and a plurality of second conductors, respectively, and the plurality of first conductors and the plurality of second conductors are alternately disposed in one direction.

3. The inductor component of claim 2, wherein the one direction is a third direction, perpendicular to the first and second directions.

4. The inductor component of claim 1, wherein, when a direction perpendicular to the first and second directions is a third direction, the first and second conductors are disposed to be shifted with respect to each other in the first direction in a range in which the first and second conductors partially overlap in the third direction.

5. The inductor component of claim 1, wherein the body is free of an additional conductor connecting the first and second conductors.

6. The inductor component of claim 1, wherein the first pad and the first conductive via are provided as a pair of first pads and a pair of first conductive vias, respectively, and the pair of first conductive vias are connected to one end and the other end of the first conductor, respectively.

7. The inductor component of claim 1, wherein the second pad and the second conductive via are provided as a pair of second pads and a pair of second conductive vias, respectively, and the pair of second conductive vias are connected to one end and the other end of the second conductor, respectively.

8. The inductor component of claim 1, wherein one end and the other end of the first conductor are a first pad area having a width greater than widths of other areas of the first conductor, and one end and the other end of the second conductor are a second pad area having a width greater than widths of other areas of the second conductor.

9. The inductor component of claim 8, wherein the first and second pad areas partially overlap in the first direction.

10. The inductor component of claim 1, wherein the first and second conductors are provided as a plurality of first conductors and a plurality of second conductors, respectively, and the plurality of first conductors and the plurality of second conductors are arranged in the first direction.

11. An inductor component comprising:

a body including a first surface and a second surface opposing each other in a first direction, and a third surface and a fourth surface connected to the first surface and the second surface and opposing each other in a second direction;

a first conductor disposed in the body and extending in the first direction;

a second conductor disposed adjacent to the first conductor in the body and extending in the first direction;

a first pad and a second pad disposed on the third surface of the body;

a first conductive via extending in the second direction and connecting the first conductor and the first pad; and a second conductive via extending in the second direction and connecting the second conductor and the second pad, wherein the first and second pads are in direct contact with the third surface of the body, and wherein, in the first direction, the first conductor is closer to the second surface of the body than the second conductor, and the second conductor is closer to the first surface of the body than the first conductor.

12. The inductor component of claim 11, wherein the first conductor and the second conductor are separated from each other in the body.

13. The inductor component of claim 11, wherein the first pad does not overlap the second pad in any direction among the first direction, the second direction, and a third direction perpendicular to the first and second directions.

14. The inductor component of claim 11, wherein the first pad and the first conductive via are provided as a pair of first pads and a pair of first conductive vias, respectively, and the pair of first conductive vias are connected to one end and the other end of the first conductor, respectively, and the second pad and the second conductive via are provided as a pair of second pads and a pair of second conductive vias, respectively, and the pair of second conductive vias are connected to one end and the other end of the second conductor, respectively.

* * * * *